United States Patent [19]

Mori

[11] 4,280,160
[45] Jul. 21, 1981

[54] ARC DISCHARGE PREVENTING CIRCUIT OF TRANSFER SWITCH FOR USE WITH INDUCTIVE LOADS

[75] Inventor: Toshihiro Mori, Sagamihara, Japan

[73] Assignee: JECO Co. Ltd., Kawasaki, Japan

[21] Appl. No.: 25,810

[22] Filed: Apr. 2, 1979

[30] Foreign Application Priority Data

Mar. 31, 1978 [JP] Japan .......................... 53-42511[U]

[51] Int. Cl.³ .............................................. H02P 1/04
[52] U.S. Cl. ........................................ 361/3; 361/5; 361/31; 318/DIG. 2; 318/443
[58] Field of Search ............................... 361/3, 5, 31; 318/DIG. 2, 443, 444

[56] References Cited

U.S. PATENT DOCUMENTS

| 2,159,298 | 5/1939 | Stansbury | 361/3 |
| 3,611,094 | 10/1971 | Bischoff | 318/DIG. 2 |
| 3,691,443 | 9/1972 | Hammer et al. | 318/DIG. 2 |
| 3,919,612 | 11/1975 | Ratzel et al. | 318/DIG. 2 |

Primary Examiner—J. D. Miller
Assistant Examiner—L. C. Schroeder
Attorney, Agent, or Firm—Townsend and Townsend

[57] ABSTRACT

A motor is energized by a source through first and second transfer switches. Each transfer switch is operated by a switching transistor. The switching transistor for the first transfer switch is driven by a drive signal while the switching transistor for the second transfer switch is driven by the output of a delay circuit responsive to an excessively large current flowing through the motor. A self-holding switch is provided to connect the motor to the source through the second transfer switch.

5 Claims, 18 Drawing Figures

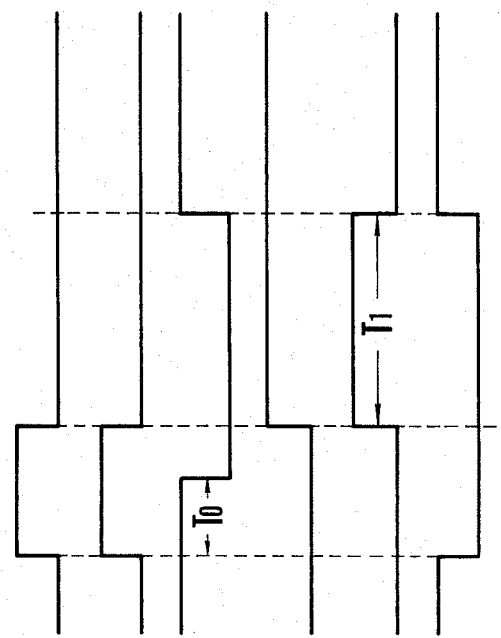
FIG.7a  INPUT TO Tr4
FIG.7b  OUTPUT OF U5
FIG.7c  INPUT VARIATION ON LINE 17
FIG.7d  OUTPUT OF U7
FIG.7e  OUTPUT OF U4
FIG.7f  OUTPUT OF U6

ARC DISCHARGE PREVENTING CIRCUIT OF TRANSFER SWITCH FOR USE WITH INDUCTIVE LOADS

BACKGROUND OF THE INVENTION

This invention relates to an arc discharge preventing circuit of a transfer switch for use with an inductive load, especially suitable for a transfer switch connected in series with an electric motor for intermittently driving a wiper of a motor car.

An example of an electronic circuit arrangement adapted to decrease arc discharge of a transfer switch circuit for inductive loads is outlined in a co-pending U.S. patent application, Ser. No. 21,132, entitled "Apparatus for Preventing Arc Discharge of Transfer Switch Circuit for Inductive Load", assigned to the same applicant as the present application. The present application is directed to specific constructions of such an electronic circuit arrangement.

According to the prior art practice, for the purpose of preventing melting and fusion of switch contacts caused by arc discharge, such spark preventing means as a resistor or a capacitor has been connected across the switch contacts.

However, in an environment where the temperature condition is severe as in a car-mounted electric arrangement, the reliability of a conventional oil filled capacitor is low, and a mylar capacitor is difficult to construct so as to have a large capacitance although its capacitance variation caused by temperature variation is small, so that these capacitors are not suitable for use as an arc preventing element of a transfer switch utilized for large inductive loads.

SUMMARY OF THE INVENTION

Accordingly, it is an object of this invention to provide an electronic arc discharge preventing circuit of a transfer switch for use with an inductive load which is capable of reliably operating over a long period.

According to this invention, there is provided an arc discharge preventing circuit of a transfer switch for use with an inductive load comprising a first contact drive circuit for operating a first transfer switch in response to a drive signal to drive the inductive load, means for detecting a predetermined time after initiation of the drive signal an excessively large current flowing through the inductive load to produce an output signal, a delay circuit responsive to the output signal of the detecting means for producing an output a predetermined time after termination of the drive signal, the delay circuit producing its output in substantially in response to the termination of the drive signal in the absence of the output signal of the detecting means, and a second contact drive circuit responsive to the output of the delay circuit for operating a second transfer switch to continue energization of the induction load for a predetermined interval, the first and second transfer switches being connected in parallel between the inductive load and a source of supply, and normally closed contacts of the first and second transfer switches being interconnected.

BRIEF DESCRIPTION OF THE DRAWINGS

In the accompanying drawings:

FIGS. 7a to 7f are timing diagrams useful to explain the operation of the delay circuit.

DESCRIPTION OF THE PREFERRED EMBODIMENT

Figure 1:
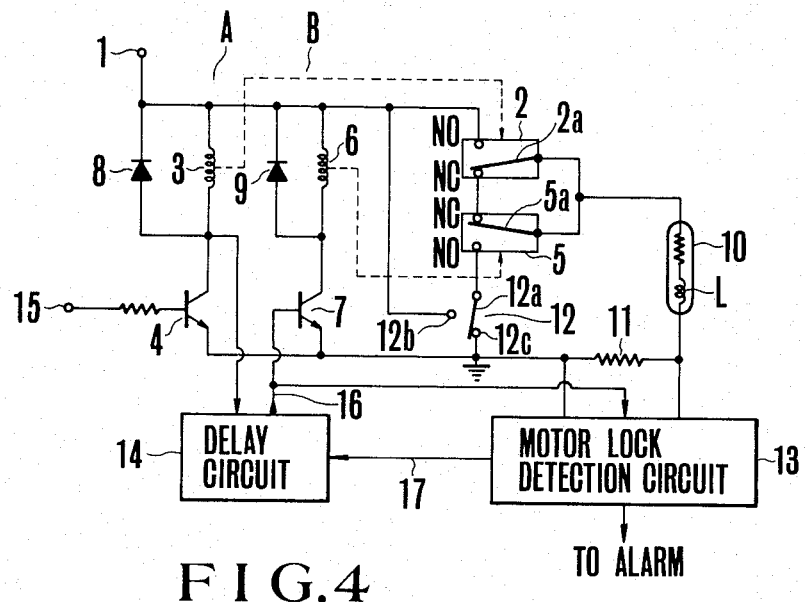
FIG. 1 is a connection diagram showing one embodiment of the arc discharge preventing circuit according to this invention.

FIG. 1 shows one example of the arc discharge preventing circuit embodying the invention and applied to a transfer switch for use with an inductive load, for example, a motor for intermittently driving a wiper of a motor car.

As shown in FIG. 1, a first contact driving circuit A and a second contact driving circuit B are connected between a source terminal 1 and ground. The first contact driving circuit A comprises an energizing coil 3 adapted to operate a first transfer switch 2 and a switching transistor 4 connected in series with the coil 3, whereas the second contact driving circuit B comprises a series connection of an energizing coil 6 adapted to operate a second transfer switch 5 and a switching transistor 7. Reverse current preventing diodes 8 and 9 are connected in parallel respectively with energizing coils 3 and 6. A normally opened contact NO of the transfer switch 2 is connected to the source terminal 1 while a wiper driving motor 10 and a resistor 11 are connected in series between a movable contact 2a of the transfer switch 2 and ground. The movable contact 2a and the normally closed contact NC of the transfer switch 2 are respectively connected to a movable contact 5a and a normally closed contact NC of the transfer switch 5. A self-holding switch 12 for the wiper driving motor 10 is connected between a normally opened contact NO of the transfer switch 5 and ground. As will be described later, a movable contact 12a of the self-holding switch 12 is transferred to a ground terminal 12c when a wiper (not shown) remains at the normal initial position and contact 12a is transferred to a terminal 12b immediately after starting of the wiper driving motor 10, thereby connecting the contact NO of the transfer switch 5 to the source terminal 1.

A motor lock detection circuit 13 is connected across resistor 11. The motor lock detection circuit 13 detects stopping of the wiper driving motor in response to an abnormal excessive current which flows through the resistor 11 when the wiper is locked by an external force. When the circuit 13 detects the stopping of the wiper, it operates an alarm device such as a lamp or a buzzer (not shown). In order to prevent the motor lock detection circuit 23 from detecting a normal excessive current, so-called rush current, which flows when the motor starts, it is provided with delay means such that the detection circuit becomes operative a predetermined time (T0) after starting the motor. In addition a delay circuit 14 is connected to receive the output of the motor lock detection circuit 13 which is fed thereto via a line 17 when the motor lock detection circuit 13 detects the abnormal excessive current other than rush current flowing through the resistor 11. In response to the output of the detection circuit 13, the delay circuit 14 produces a signal which turns on the switching transistor 7 of the second contact driving circuit B a predetermined time (T1) after turning off the switching transistor 4 of the first contact driving circuit A. In the absence of an output signal from the motor lock detection circuit 13, the delay circuit 14 produces an output which turns on the switching transistor 7 at the same time, or slightly after the switching transistor 4 is turned off.

Figures 2A, 2B, 2C, 2D, 3A, 3B, 3C, 3D:
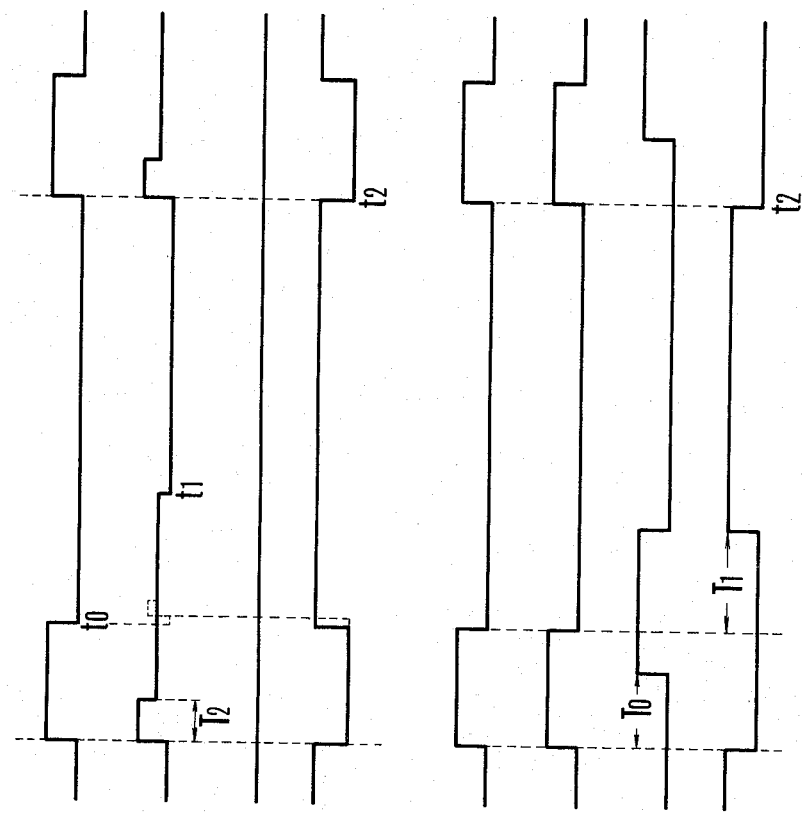
FIGS. 2a to 2d and 3a to 3d are timing diagrams useful to explain the operation of the arc discharge preventing circuit shown in FIG. 1.

In connection with intermittent drive of the wiper, normal operation of the motor 10 is shown in FIGS. 2a to 2d which show various timing signals for one cycle. When a wiper start signal as shown in FIG. 2a is intermittently applied to the base electrode of the switching transistor 4 via an external terminal 15, transistor 4 is turned on. Current then flows through the energizing coil 3 to throw the movable contact 2a of transfer switch 2 to the normally opened contact NO. In response, the motor 10 starts to drive the wiper and the self-holding switch 12 is thrown to contact 12b to connect the normally opened contact NO of the transfer switch 5 to the source terminal 1. When motor 10 starts, a large rush current flows but this current decreases quickly (after time T2) to a normal value as shown in FIG. 2b. Although the rush current flows through resistor 11, the motor lock detection circuit 13, which becomes operative a predetermined time (larger than T2) after starting of motor 10, does not respond to the starting rush current as shown by FIG. 2c. At time t0, when the wiping start signal as shown in FIG. 2a falls to zero, or a short time later as indicated by dotted line in FIG. 2d, the delay circuit 14 supplies a signal as shown in FIG. 2d to the base of the switching transistor 7 via a line 16 to thereby turn on the switching transistor 7. At the time, when the movable contact 2a of the transfer switch 2 engages its normally closed contact NC, or shortly thereafter, the operating coil 6 throws the movable contact 5a of the transfer switch 5 to its normally opened contact NO. Thereafter, the wiper motor 10 is driven from the source terminal 1 through the self-holding switch 12 and the transfer switch 5, and continues to rotate at the previous speed with the normal operating current freed from any starting rush current as shown in FIG. 2b. When the wiper has completed one reciprocation at time t1, the movable contact 12a of the self-holding switch 12 is transferred to the ground contact 12c to disconnect the power supply from the motor 10. At this time, the transistor 7 still remains conductive to connect the movable contact 5a of the transfer switch 5 to the contact NO. Accordingly, a closed circuit for short-circuiting the wiper driving motor 10 is established so that the motor 10 undergoes electromagnetic braking and stops rapidly. The transistor 7 is turned off at time t2 later than time t1 by, for example, the initiation of the wiper start signal. When the transistor 7 was turned on a short time after time t0, at which time the wiper start signal terminates, a transient current as indicated by dotted line in FIG. 2b will flow. The magnitude of this current, however, is sufficiently small to preclude any adverse affect on the rotation of the motor.

The operation of the motor when the wiper is locked by an external force will now be described with reference to FIGS. 3a to 3d which also show several timing signals for one cycle of the sequence. When a wiper start signal shown in FIG. 3a is applied to the base electrode of the switching transistor 4, the transfer switch 2 is operated to drive the wiper motor 10. Assuming now that the wiper is locked by an external force, an abnormal excessive current as shown in FIG. 3b will flow through the motor 10 while the wiper start signal is being applied. Since this excessive current also flows through the resistor 11 connected in series with the motor, the motor lock detection circuit 13 detects the excessive current a definite time (T0) after starting the motor as shown in FIG. 3c. Accordingly, the motor lock detection circuit 13 sends an alarm signal to a lamp or a buzzer and an output signal to the delay circuit 14 via the line 17. In response to this output, the delay circuit 14 produces a signal which turns on switching transistor 7 a predetermined time (T1) after the switching transistor 4 is turned off and which is supplied to the detection circuit 13 to disable it from producing the detection signal and the alarm signal. Since the wiper is locked to its initial position, the movable contact 12a of the self-holding switch 12 remains connected to the ground terminal 12c. As a result, even though the transistor 7 is turned on to cause the movable contact 5a of the transfer switch 5 to be transferred to the contact NO, the motor 10 is disconnected from the source of supply. The transistor 7 is turned off at time t2.

The driver circuit for intermittently driving the wiper with the above construction will now be described from the standpoint of the arc discharge prevention.

When the wiper is locked (e.g., by snow laid on the front glass of the motor car), the wiper driving motor 10 is overloaded and stopped, forming a large inductive load L. In such a case, when disconnecting the motor from the source of supply, the movable contact 2a of the transfer switch 2 is transferred from the normally opened contact NO to the normally closed contact NC which is connected to the movable contacts 2a and 5a of respective transfer switches 2 and 5 which are floating with respect to ground. Accordingly, after the movable contact 2a has engaged the normally closed contact NC, the arc caused by the discharge of the electromagnetic energy stored in the inductance L of the motor at the instant that the movable contact 2a of transfer switch 2 separates from the contact NO will not be affected continuously by the source energy from the terminal 1. The movable contact 5a of the transfer switch 5 is thrown to the normally opened contact NO a predetermined time (T1) after engagement of the movable contact 2a with the normally closed contact NC of the transfer switch 2. This tends to permit the continuous operation of the motor 10 through the self-holding switch 12. At this time, however, since the wiper was originally locked, the movable blade 12a of self-holding circuit 12 is coupled to the ground contact 12c. For this reason, the movable contact 5a of the transfer switch 5 engages the ungrounded normally closed contact NC during the time T1 whereby the arc between the movable contact 2a and the normally opened contact NO of the transfer switch 2 is extinguished during this time T1.

As described above, the arc discharge preventing circuit does not use a capacitor whose reliability is affected by temperature so that the circuit of this invention can decrease or prevent arc discharge of a transfer switch over a long time period and under extreme environmental conditions.

While in the embodiment shown in FIG. 1 an alarm signal is produced for operating a lamp or a buzzer when a wiper is locked by an external force, in certain cases it is not necessary to produce such alarm signal. Further, it is noted that, the invention is not limited to a wiper driving motor but is also applicable to a transfer switch which controls any inductive load.

Figure 4:
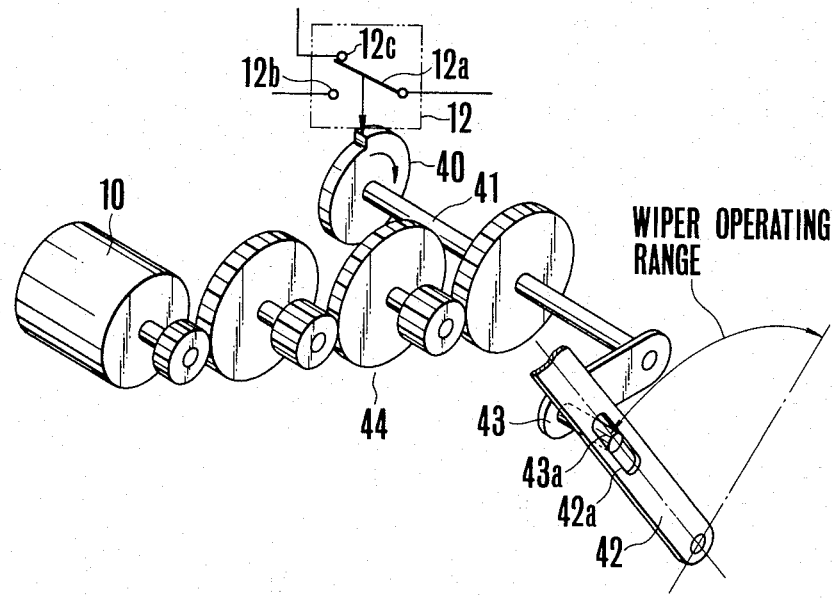
FIG. 4 is a perspective view showing an example of a self-holding switch driving mechanism.

The self-holding switch 12 operates as described above by being driven by a cam switch mechanism such as that shown in FIG. 4, for example. The driving mechanism shown has a cam 40 which engages the movable contact 12a of the self-holding switch 12. At the opposite end of a rotating shaft 41 supporting the cam 40 at one end is secured a wiper driving lever 43 having a pin 43a slidable in an elongated slot 42a of a wiper arm 42. The cam 40 has a circumference portion determined by the long diameter hereinafter called the high point) and a circumference portion determined by the short diameter (hereinafter called the low point), and the cam 40 is fixed to the rotating shaft 41 such that the high point of the cam is in engagement with the movable contact 12a at the initial position (shown in the drawing) immediately before the normal starting of the wiper.

Consequently, when the wiper motor 10 causes the cam 40 to rotate in the direction of the arrow via a reduction gear train 44, the movable contact 12a instantly engages the low point of the cam in order to transfer the movable contact 12a to the terminal 12b and the wiper arm 42 starts its clockwise movement. With the return of the wiper arm 42, the movable contact 12a returns from the terminal 12b to the terminal 12c.

Figure 5:
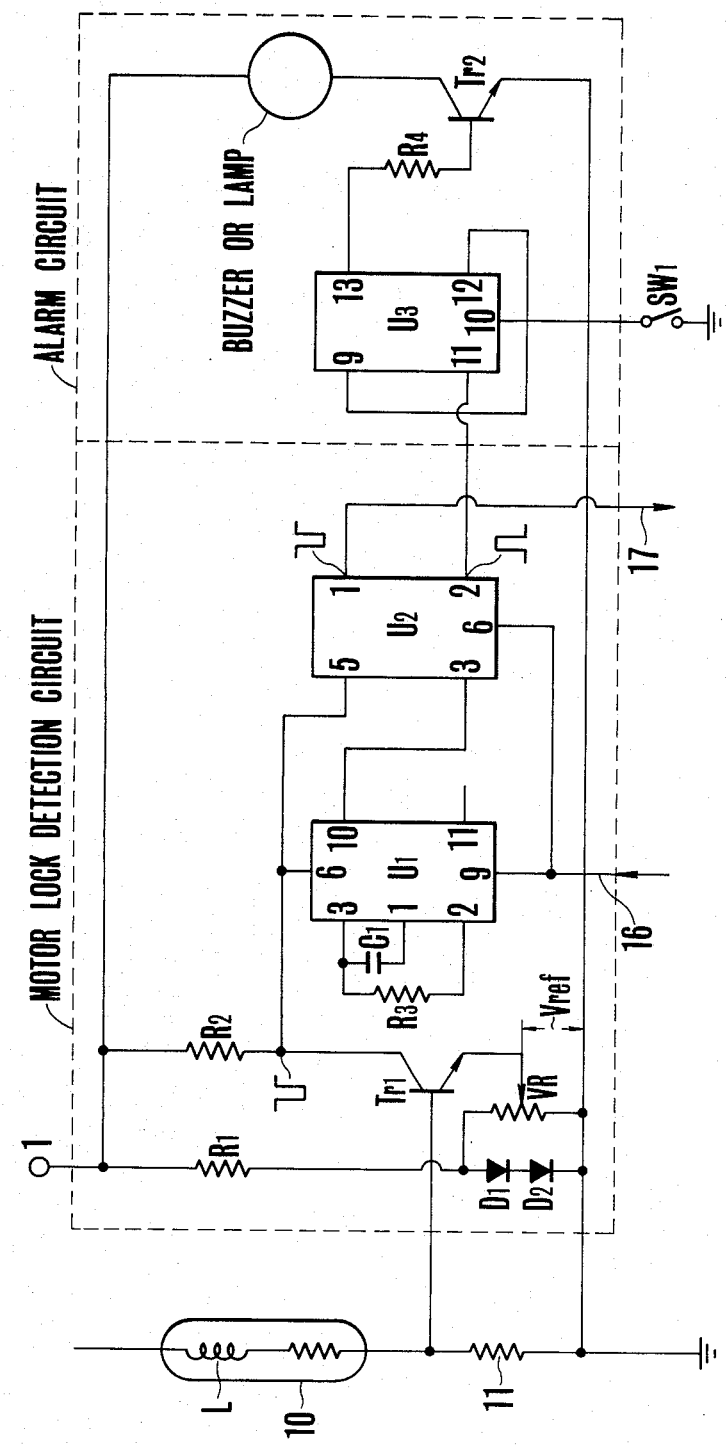
FIG. 5 is a connection diagram showing details of the motor lock detection circuit and the alarm circuit.

An example of the motor lock detection circuit 13 according to this invention will now be explained with reference to FIG. 5. The base of an input transistor Tr1 of the motor lock detection circuit 13 is connected to a junction between the wiper motor 10 and the resistor 11 connected in series therewith. The emitter of the transistor Tr1 is connected to a reference voltage generating circuit comprising a registor R1, diodes D1 and D2 connected in series with the resistor R1 and a variable resistor VR connected in parallel with the series diodes D1 and D2. The collector of the transistor Tr1 is connected to an resistor R2. The common junction of the resistors R1 and R2 is connected to the source terminal 1. The output of Tr1 is fed to a one-shot multivibrator U1 comprising a CMOS digital IC type, CD4047B, manufactured by RCA and to a D-type flip-flop U2 comprising a CMOS digital IC type, CD4013B, also manufactured by RCA. To the one-shot multivibrator U1 a capacitor C1 is connected between pins 3 and 1 and a resistor R3 between a pin 2 and the pin 3, and the one-shot multivibrator generates a pulse with a width T0 (FIG. 3c) corresponding to the time constant determined by the capacitor C1 and the resistor R3. By detecting an excessive current from the fall of this pulse, the timing of the detection is delayed. If there is still an excessive current in the resistor 11 when one-shot U1 times out, the D-type flip-flop U2 is triggered by that fall and outputs will appear at output pins 1 and 2 of the D-type flip-flop U2.

Where $V_{BE}$ represents the voltage between the base and the emitter of the transistor Tr1, Iw the current of the wiper motor, Iwmax the excessive current of the wiper motor, Iwo the normal current of the wiper motor, V the voltage drop across the resistor 11, and Vref the voltage of the reference voltage generating circuit, the expression $$V = Iw \times Rn$$

stands. By adjusting the reference voltage Vref with the variable resistor VR so as to make $$Iwmax \times R11 > Vref + V_{BE} > Iwo \times R11,$$

an output is obtained at a junction between the resistor R2 and the collector of the transistor Tr1 only when the excessive current flows through the resistor 11. This junction is normally at the potential of the source of supply but assumes in response to the excessive current a negative potential (of about zero volt). In accordance with the negative output, the output appearing at the pin 1 of the D-type flip-flop U2 becomes negative and the output appearing at the pin 2 positive.

The positive output at the pin 2 of the D-type flip-flop U2 is supplied to an alarm circuit which energizes a buzzer or a lamp. The alarm circuit has a D-type flip-flop U3 comprising a type CD4013B IC, a pin 11 of which receives the output of the motor lock detection circuit to transmit a positive output from a pin 13. This output turns on a transistor Tr2 through a resistor R4, thereby energizing the buzzer or the lamp. To deenergize the buzzer or the lamp, a manual switch SW1 is provided, which is connected between a pin 10 and ground.

Figure 6:
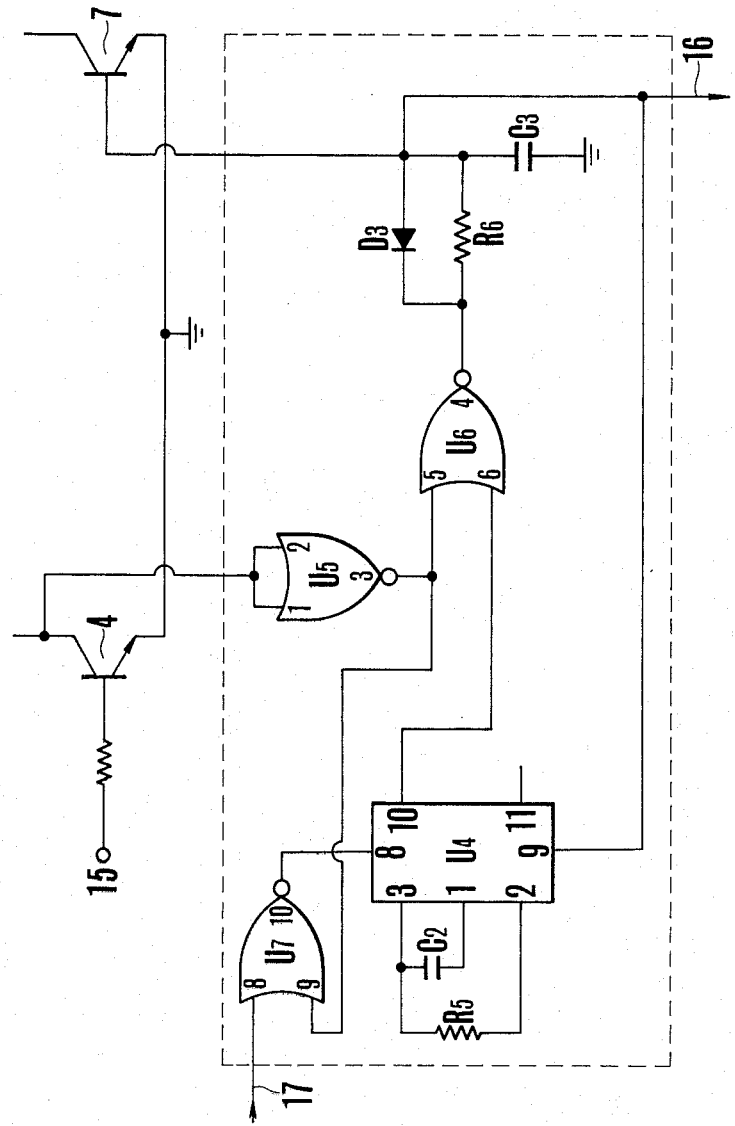
FIG. 6 is a connection diagram showing the construction of the delay circuit.

FIG. 6 shows an example of a delay circuit 14 according to this invention. As indicated in the drawing, the delay circuit has a NOR gate U7, one input of which receives a negative output of the motor lock detection circuit 13 through the line 17 and the other input of which is connected to the output of a NOR gate U5 and to one input of a NOR gate U6. The output of the NOR gate U7 is connected to the trigger input (pin 8) of a one-shot multivibrator U4 comprising a type CD4047b IC. Between pins 1 and 3 and between pins 2 and 3 of the one-shot multivibrator U4 are respectively connected a capacitor C2 and a resistor R5, and when triggered, a pulse corresponding to a time constant of the capacitor C2 and the resistor R5 is generated at the output (pin 10). This pulse output is supplied to the other input of a NOR gate U6. Further, the two inputs of the NOR gate U5 are commonly connected to the collector of the transistor 4 and the output of the NOR gate U6 is transmitted to a delay circuit comprising a resistor R6, a capacitor C3 and a diode D3. The delay circuit thus generates a pulse acting as a signal for driving the transistor 7 and for resetting the motor lock detection circuit 13. The NOR gates U5, U6 and U7 preferably comprise CMOS digital IC's type, CD4001B, manufactured by RCA.

The operation of the delay circuit 14 will now be explained. First, when no excessive current is detected by the motor lock detection circuit 13, the input from the line 17 does not vary and since the one-shot multivibrator U4 is, therefore, not triggered, the output is nil. Thus, this status is equivalent to a connection wherein the other input (pin 9) of the NOR gate U7 and the output (pin 10) of the one-shot multivibrator U4 are disconnected, and the NOR gate U6 operates as an inverter. In this case, when the transistor 4 (which has been conductive on account of the presence of the wiper signal is turned off (at this time the movable contact 2a of the transfer switch 2 is transferred to the contact NC), the output of U6 becomes positive and the transistor 7 is turned on after a period of time corresponding to the time constant determined by the resistor R6 and the capacitor C3 (at this time the movable contact 5a of the transfer switch 5 is transferred to the contact NO). Simultaneously, a reset signal is transmitted via the line 16 but since the motor lock detection circuit has not detected any excessive current, the state of one-shot U4 is unaffected. The delay circuit including the resistor R6, the capacitor C3 and the diode D3 is not required if the operations of the transfer switches 2 and 5 are completely switched around one another.

A situation in which the motor lock detection circuit 13 has detected the excessive current will now be explained with reference to FIGS. 7a through 7f. When a wiper signal as shown in FIG. 7a is supplied to the base of the transistor 4, the transistor 4 is turned on to cause the potential of the collector to fall. But, this negative-going potential is inverted at the NOR gate U5 and the output of the NOR gate U5 rises as shown in FIG. 7b. Then, further, the output of U5 is inverted and the output of the NOR gate U6 falls as shown in FIG. 7f. When time T0, corresponding to the width of the output pulse from the one-shot multivibrator U1 of the motor lock detection circuit 13 elapses from the initiation of the wiper signal, a negative signal (for the purpose of explanation a positive signal is indicated in FIG. 3c) appears on the line 17 as shown in FIG. 7c. Subsequently, when the transistor 4 is turned off, one input (pin 8) of the NOR gate U7 receives a negative signal on the line 17 and the other input (the pin 9) receives a negative signal from the NOR gate U5 so that the output of the NOR gate U7 becomes positive as shown in FIG. 7d. Consequently, the one-shot multivibrator U4 is triggered and a pulse with a width corresponding to T1 is generated as shown in FIG. 7e. At the end of time period T1, a negative signal is supplied to both the inputs of the NOR gate U6 which in turn sends a positive signal for driving the transistor 7 and for resetting the motor detection circuit.

What is claimed is:

1. An arc discharge preventing circuit of a transfer switch for use with an inductive load comprising a first contact drive circuit for operating a first transfer switch in response to a drive signal for driving said inductive load, means for detecting a predetermined time after initiation of said drive signal an excessively large current flowing through said inductive load to produce an output signal, a delay circuit responsive to said output signal of said detecting means for producing an output a predetermined time after termination of said drive signal, said delay circuit producing its output substantially in response to the termination of said drive signal in the absence of said output signal of said detecting means, and a second contact drive circuit responsive to the output of said delay circuit for operating a second transfer switch to continue energization of said inductive load for a predetermined interval, said first and second transfer switches being connected in parallel between said inductive load and a source of supply, and normally closed contacts of said first and second transfer switches being interconnected.

2. An arc discharge preventing circuit according to claim 1 wherein said inductive load comprises a motor for operating a wiper of a motor car and wherein said means for detecting the excessively large current detects stoppage of said motor when said wiper is locked by an external force.

3. An arc discharge preventing circuit according to claim 2 which further comprises a self-holding switch actuatable in response to the rotation of said motor, said self-holding switch including a first contact which connects said second transfer switch to a source of electrical power in series with said motor, and a second contact which grounds said second transfer switch.

4. An arc discharge preventing circuit according to claim 1 wherein said first contact drive circuit comprises a first energizing coil for actuating said first transfer switch, and a first switching transistor connected in series with said first energizing coil; said second contact drive circuit is connected in parallel with said first contact drive circuit and comprises a second energizing coil for actuating said second transfer switch, and a second switching transistor connected in series with said second energizing coil; and wherein the base electrode of said first switching transistor is connected to receive said drive signal and the base electrode of said second switching transistor is connected to receive the output of said delay circuit.

5. An arc discharge preventing circuit according to claim 1 wherein said excessively large current detecting means comprises means for detecting a voltage corresponding to a current flowing through said inductive load and producing a first output when the detected voltage exceeds a reference voltage, means driven by said first output to produce a pulse of a predetermined width, and means driven by said first output and the termination of said pulse to produce a second output for driving said delay circuit.

* * * * *

UNITED STATES PATENT AND TRADEMARK OFFICE
CERTIFICATE OF CORRECTION

PATENT NO. : 4,280,160
DATED : July 21, 1981
INVENTOR(S) : Toshihiro Mori, Sagamihara, Japan It is certified that error appears in the above-identified patent and that said Letters Patent are hereby corrected as shown below:

Column 1, line 54 delete "in", first occurrence.

Column 5, line 41, change "an resistor" to --a resistor--.

Signed and Sealed this

Second Day of February 1982

[SEAL]

Attest:

Attesting Officer

GERALD J. MOSSINGHOFF

Commissioner of Patents and Trademarks